May 9, 1967  H. A. WILHELM ETAL  3,318,246
PHOSPHIDE COATING ON REFRACTORY METALS
Filed March 23, 1965  2 Sheets-Sheet 1
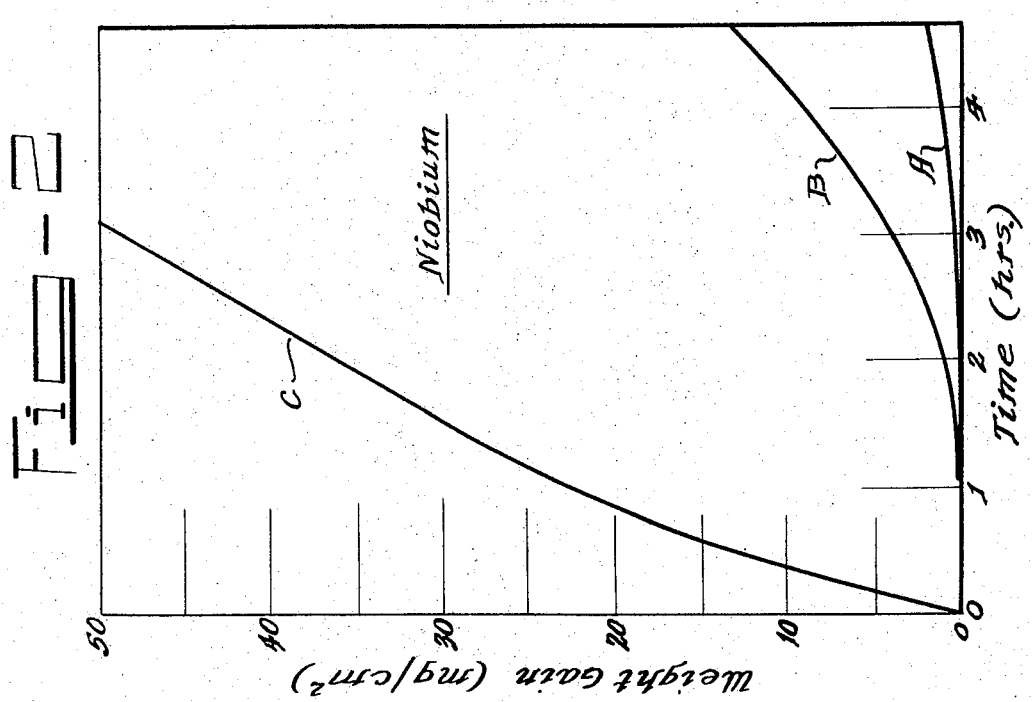
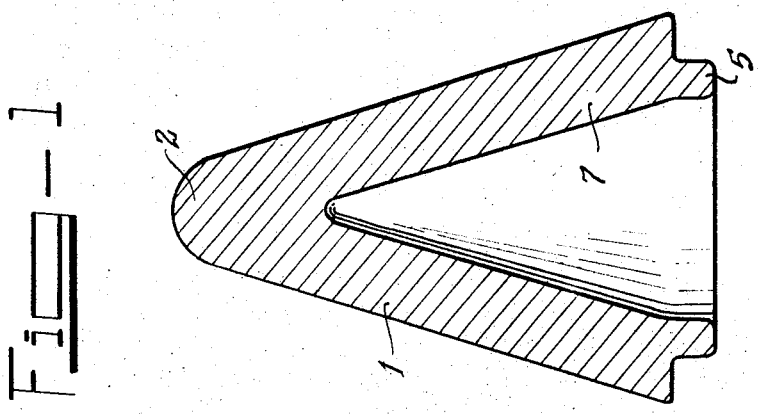
INVENTORS
Harley A. Wilhelm
James H. Witte
BY
Attorney

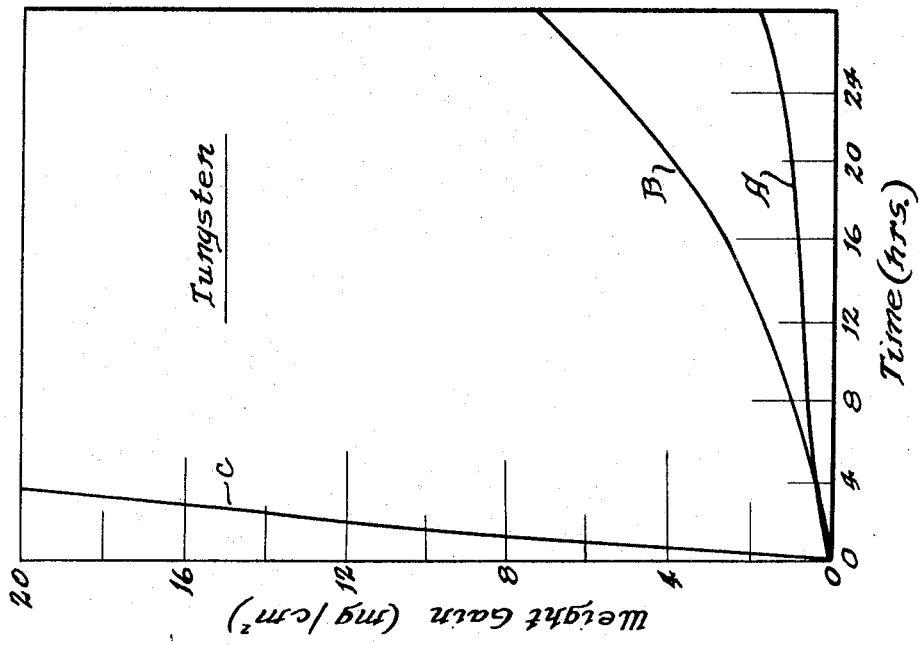
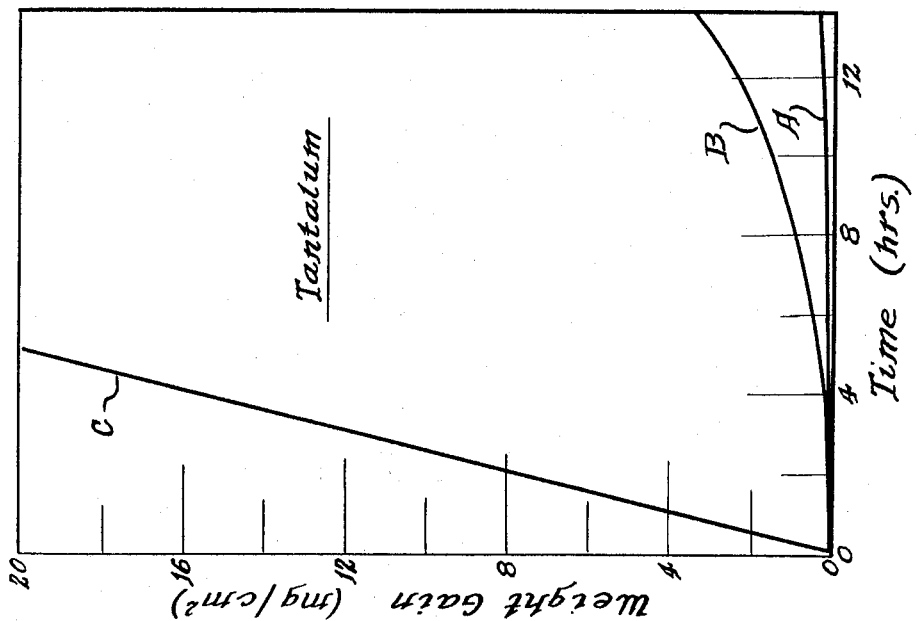

3,318,246
PHOSPHIDE COATING ON REFRACTORY METALS
Harley A. Wilhelm, Ames, Iowa, and James H. Witte, Cincinnati, Ohio, assignors to the United States of America as represented by the United States Atomic Energy Commission
Filed Mar. 23, 1965, Ser. No. 442,218
3 Claims. (Cl. 102—92.5)

The invention described herein was made in the course of, or under, a contract with the United States Atomic Energy Commission.

This invention relates to a method of imparting oxidation resistance to certain refractory metals for short but importantly useful periods of time. It also relates to a re-entry nose cone and other articles of manufacture based on this oxidation resistance.

The metals niobium, tantalum and tungsten have particularly desirable high strengths at very high temperatures, but are susceptible to rapid oxidation in an atmosphere containing oxygen.

A re-entry nose cone for a space vehicle is exposed to drastic conditions upon re-entry. Since the velocity does not reach its maximum until there is little atmosphere left, during the launching cycle, there is no problem. However, on re-entry it is travelling at maximum velocity, heat generation is enormous for a very short period.

Surface coatings in the past have been less than satisfactory. Silicide coatings on tungsten evaporates as silicon monoxide at high temperatures. For a description of prior attempts to protect the surfaces for space use, reference is made to "Applications of Refractory Metals," by R. I. Jaffee, Journal of Metals, May 1964, page 410 ff.

The inventors found that an exposure for a prolonged period to phosphorous vapor at an elevated temperature, causes a protective layer of a phosphorous containing substance to form, which substantially lengthens the useful life of the metals, tantalum, niobium and tungsten.

Further, it was found that rounding off sharp edges, even to a very small radius further extended the useful life of these metals at high temperatures. This rounding must be done prior to phosphorous treatment.

The method is applicable to the metals listed above, tantalum, niobium and tungsten as well as alloys containing major proportions of these metals.

The invention is best understood and evaluated by reference to the drawings. FIGURE 1 is a section view of a typical nose cone utilizing the principles of this invention. FIGURES 2, 3 and 4 are graphical representations of the oxidation rates, expressed as weight gains against time for base metal, phosphided metal with sharp edges and phosphided metal with rounded edges, for the metals niobium, tantalum and tungsten respectively.

FIGURE 1 shows a tungsten nose cone for a space vehicle in cross section. A hollow conical body of tungsten 1 blends into a rounded end 3 at the apex of the cone. A short hollow cylindrical section blends into the inner surface 7 of the conical body 1. The outer diameter of cylindrical section 5 is sufficiently smaller than the largest diameter of conical body 1, to be accommodated into a corresponding opening in the space vehicle (not shown) and form a continuous unbroken surface.

The process of the invention is best practiced by slowly passing phosphorous vapor over the surface of the metal heated to about 900° C. in a vacuum, except for the phosphorous vapor, for a period of approximately 72 hours. The phosphorous vapor is conveniently generated by heating phosphorus to about 350° C. in a separate vessel communicating with the vessel containing the metal to be treated. Since an excess of phosphorus is required, because of the low rate of absorption, it is desirable to have a cold leg to collect the excess, particularly since the condensate is found in the pyrophoric yellow allotropic form.

Depending on the metal to be coated from 1½ to 4½ grams of phosphorus is charged for each square centimeter of surface.

The metal to be treated requires some surface preparation. Grinding with a series of silicon carbide papers, ranging from 240 to 600 grit, is a suitable method. Corners are rounded to a satisfactory degree by the use of silicon carbide paper. A radius of 0.5 mm. has been found to be sufficient to provide the benefical effects noted.

It is believed that the effectiveness of the phosphide coating in delaying oxidation originates in the mechanism of oxidation. The oxygen must diffuse through the coating to attack. Failure occurs when sufficient oxygen diffuses through the coating to form an oxide underlayer. When this underlayer builds up to a sufficient thickness, the increased volume inherent in the change from metal to oxide applies a stress on the phosphide case, causing a separation from the base metal. The base metal is then vulnerable to direct oxidation attack. The protective action of the rounded corner is believed to be due to the reduction of stress normally concentrated at the corners. While this mechanism is believed to be a correct explanation, we do not wish to be bound by it. Instead, reliance is to be placed in the fact that substantial improvement was found on following the teachings of this disclosure.

*Example*

Samples of each metal ¾" x ⅜" x ⅛" were milled to smooth surfaces. All samples were then ground to a 600 grit finish by using a series of silicon carbide papers from 240 to 600 grit. Corners were rounded on two samples of each metal by means of silicon carbide paper.

Four samples of each metal were introduced into a 13 mm. ID Vycor tube and positioned in the center of the tube. A quantity of seven grams of phosphorus were placed in a downward directed arm of the tube. The tube was then evacuated and sealed. The other end of the tube was cooled in liquid nitrogen. The portion of the tube containing the samples was heated to 900°±30° C. and the portion containing the phosphorus was heated to 350°±10° C. and these temperatures maintained for 72 hours. The tube was allowed to cool, then broken open under water because of the collection of pyrophoric yellow phosphorus on condensation. The phosphided samples were dried with methanol.

Samples of each metal thus phosphided were sectioned and the case thickness estimated metallographically. The amount of phosphorus absorbed was determined by weighing before and after treatment. The following table shows the changes in the samples.

TABLE I.—CHANGES IN METAL SAMPLES DUE TO PHOSPHIDING TREATMENT

| Phosphide Metal | Nb | Ta | W |
| --- | --- | --- | --- |
| Area of Samples (cm.$^2$) | 3.94 | 4.12 | 2.82 |
| Phosphorus Pickup (gms.) | 0.0151 | 0.0070 | 0.0020 |
| Measured depth of case, ave. ($\mu$) | 12 | 4.0 | 4.0 |
| Calculated grams P/cm.$^3$ in case (from experimental data) | 3.19 | 4.25 | 1.77 |
| Assumed Case Species | Nbp$_2$ | TaP$_2$ | WP |

Oxidation tests were obtained using an automatic recording balance on samples suspended in a furnace kept at 800°±5° C. with dry air flowing at the rate of 450 ml. (STP) per minute. The air was dried through two sulfuric acid bubblers followed by two dehydrating columns.

Weights were recorded continuously during the oxidation tests. Weight gain was calculated as grams per cm.² to bring to a usable basis.

Results are shown in FIGURES 1, 2 and 3 covering samples of Nb, Ta and W respectively. Tests included untreated samples (line A), phosphided samples with square corners (line B) and phosphided samples with rounded corners (line C). There is an excellent showing of marked improvement in oxidation resistance for the treated specimens. The specimens with rounded corners, in each case, were much superior to those having sharp corners.

It is clear from examination of FIGURES 2, 3 and 4 that the useful life of these refractory metals is substantially extended, when they are heated in an oxidizing atmosphere. Periods of several hours use under these otherwise severe conditions are feasible.

This invention is not to be limited to the details given herein but may be modified within the scope of the appended claims.

What is claimed is:
1. An object of manufacture comprising: a shaped body of a metal of the class consisting of tantalum, niobium, tungsten and alloys predominantly of these metals, the surface of which is coated with a phosphide of the said metal formed in situ.
2. The object of claim 1 in which all corners are rounded.
3. The object of claim 2 which is in the form of a hollow cone with a rounded apex.

References Cited by the Examiner

UNITED STATES PATENTS 3,090,703  5/1963  Gruber et al. _____ 117—127

References Cited by the Applicant

UNITED STATES PATENTS 3,127,285  3/1964  Gedgaudas et al.

OTHER REFERENCES

Applications of Refractory Metals, R. I. Jaffee (Journal of Metals, 410–15, 1964).

Nuclear Corporation of America, Research Chemical Division. Refractory intermetallic compounds (progress report on), Contract No. W–61–0257C; Phoenix, Ariz., author, 1961.

Gingerich, K. A.: A high temperature study of titanium and zirconium phosphides and related refractory metals, Pennsylvania State University, University Park, Pa. 1962.

ROBERT F. STAHL, *Examiner.*

BENJAMIN A. BORCHELT, *Primary Examiner.*